Patented Feb. 9, 1943

2,310,789

UNITED STATES PATENT OFFICE 2,310,789

LINEAR POLYMERIC AMIDINE SALTS

Madison Hunt and James Emory Kirby, Wilmington, Del., assignors to E. I. du Pont de Nemours & Company, Wilmington, Del., a corporation of Delaware No Drawing. Application August 2, 1940, Serial No. 350,108

22 Claims. (Cl. 260—2)

This invention relates to new polymeric products and more particularly to polymeric salts.

This invention has as an object the preparation of new polymeric materials. A further object is the preparation of synthetic polymeric compounds for biological purposes, e. g., pharmaceuticals, plant growth stimulants, etc. Another object is the preparation of new bactericides and fungicides. Other objects will appear hereinafter.

These objects are accomplished by the following invention of polymers and preferably linear polymers having, as integral chain members, a plurality of primary amidine salt groups, i. e. groups of the formula:

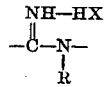

wherein R is hydrogen or an alkyl group of from one to five carbon atoms and X is an organic or inorganic anion, i. e., HX is an acid, and the process of making the same wherein a diiminoether salt of a hydrogen halide of molecular weight greater than 36 and preferably less than 127 which has at least four chain members between the carbon atoms carrying the imino groups is reacted in a solvent inert to the reactants with a primary or secondary diamine which has at least four linear atoms separating the two amino nitrogen atoms and having an alkyl group of from one to five carbon atoms or, preferably, hydrogen attached to the amino nitrogen atoms.

The products of this invention are salts of linear polymers characterized by a multiplicity of trivalent nitrogen atoms as integral members of the linear chain, at least two valences of said nitrogen atoms being linked to carbon atoms, and further characterized by a lateral imino group which carries a hydrogen atom, this imino group being attached to one of the chain carbon atoms directly attached to a chain nitrogen atom; the carbon atoms carrying the imino group are attached by one valence bond to another chain carbon atom and are separated from each other by at least four linear atoms exclusive of the chain nitrogen atom.

The products of this invention are prepared by adding quickly with cooling an equivalent amount of a primary or secondary diamine to a solution or suspension, in an inert solvent for at least one of the reactants, for example, methanol, of a highly purified diiminoether salt of a hydrogen halide of molecular weight of at least 36 and preferably less than 127, which diimino ether salt has at least four chain members between the carbon atoms carrying the imino groups. The reactants are best cooled to 0° before they are mixed. The solution is then shaken until the iminoether salt has dissolved and then allowed to stand at about 25-30° for several hours. The solvent is removed by evaporation or distillation and the products are dried, preferably in vacuo. The products are in general very hygroscopic solids, soluble in water and in alcohol, but insoluble in benzene, ether, chloroform, and petroleum ether.

The diiminoether salts utilized in this invention are prepared as follows:

In general, the diiminoether salts may be prepared by treating the corresponding nitriles, under anhydrous conditions, with an acid in the presence of an alcohol. The preferred alcohols are members of the lower primary aliphatic alcohols such as methanol or ethanol. The preferred acids are hydrochloric and hydrobromic acids. The process is preferably carried out at 0° C. The reaction is relatively slow, requiring from 10-24 hours for completion. The crude iminoether salt separates from solution or may be precipitated from the solution with ether. The alcohol used to prepare the iminoether may also be used as a diluent for the reaction. However, other diluents such as benzene or ether may also be used.

The purification of the iminoether salt is best accomplished by dissolving the crude material in warm (90° C.) glacial acetic acid, filtering the solution to remove ammonium chloride formed as a by-product, and cooling to precipitate the iminoether salt. In certain cases, it may be necessary to add a non-polar solvent such as ether to the acetic acid solution. The iminoether salts may also be recrystallized for purification by dissolving them in an alcohol, preferably methyl or ethyl alcohol, and reprecipitating the salt by addition of a non-polar solvent such as ethyl acetate or ether.

A specific example follows:

EXAMPLE A.

Preparation of dimethyladipimidate hydrochloride

To a cooled (0° C.) anhydrous solution of 100 parts of adiponitrile in 800 parts of methanol is added dry hydrogen chloride gas in a rapid stream with stirring. The hydrogen chloride (anhydrous) is bubbled through the solution for 6 hours. The mixture is kept at 0° C. for 10 hours additional and is then diluted with an equal volume of ether. The product is filtered off and washed with dry ether. The yield is 200 parts of product. This crude material is partially dissolved in 1000 parts of acetic acid at 90°. The insoluble material is removed by filtration and the solution is cooled to 15° C. and the product which separates is filtered off. This product is washed with ether and dried. The product is then dissolved in the minimum amount of methanol and the solution treated with two volumes of ethyl acetate. Just as crystallization sets in the mixture is filtered and a third volume of ethyl acetate is added. The solution is cooled to 0° and filtered. The product is filtered and washed with dry ether. The yield is 90 parts. This product gives correct analytical figures.

The diamines employed may be prepared by reduction of the corresponding dinitriles as described in U. S. Patent No. 2,166,152 issued July 18, 1939, to B. W. Howk. The secondary diamines may be prepared by treating the corresponding bromo compounds with an amine according to well-known procedures.

The more detailed practice of the invention is illustrated by the following examples, wherein parts given are by weight. There are of course many forms of the invention other than these specific embodiments.

EXAMPLE I

*Polymeric hexamethyleneadipamidine hydrochloride*

A suspension of 2.73 parts of diethyl adipodiimidate dihydrochloride (adiponitrile diethyl diiminoether dihydrochloride $$\left( \begin{array}{c} C_2H_5-O-C-(CH_2)_4-C-O-C_2H_5 \\ \parallel \qquad \qquad \qquad \parallel \\ NH-HCl \quad \ NH-HCl \end{array} \right)$$

in 3 parts of absolute ethanol is cooled to 0°, and mixed, with shaking and cooling wtih a solution of 1.16 parts of hexamethylene diamine in 7 parts of absolute ethanol cooled to 0°. The mixture is then allowed to stand 48 hours at 25°. The ethanol is removed by evaporation in vacuo. The residue is washed with dry ether and dried in vacuo. A white hygroscopic solid results which is soluble in ethanol and in water. The yield is almost quantitative.

EXAMPLE II

*Polymeric p-xylyleneadipamidine hydrochloride*

A solution of 1.361 parts of p-xylylenediamine in 7 parts of dry methanol cooled to 0° is added rapidly with shaking and cooling, to a suspension of 2.451 parts adiponitrile dimethyl diiminoether dihydrochloride in 10 parts of dry methanol cooled to 0° C. The mixture is then allowed to stand 24 hours at 25°. The methanol is removed by evaporation in vacuo, and the residue washed with dry ether and dried in vacuo. A white hygroscopic solid which is soluble in methanol and in water, results in almost quantitative yield.

EXAMPLE III

*Polymeric (p-methylenediphenylene) adipamidine hydrochloride*

To a suspension of 2.451 parts of adiponitrile dimethyl diiminoether dihydrochloride in 20 parts of dry methanol, cooled to 0° is added, with shaking, 1.983 parts of 4,4′-diaminodiphenylmethane suspended in 6 parts of cold methanol. The mixture is then allowed to stand 48 hours at 25°, after which time it is filtered and concentrated to dryness in vacuo. The product is washed with dry ether and dried in vacuo. A slightly yellow product is obtained, which is soluble in water and is extremely hygroscopic. The yield is 2.85 parts. Analysis: Calculated for $C_{19}H_{22}N_4.2HCl$: Calculated 14.77% N. Found 14.17%.

EXAMPLE IV

*Polymeric dioxytriethylene sebacamidine hydrochloride*

To a suspension of 3.012 parts of sebaconitrile dimethyl diiminoether dihydrochloride,

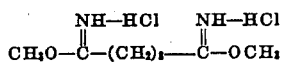

in 10 parts of dry methanol cooled to 0°, there is added a cooled solution of 1.482 parts of triglycoldiamine in 2 parts of dry methanol. The mixture is shaken and allowed to stand 24 hours at room temperature. The methanol is removed in vacuo, and the product is washed with dry ether and dried in vacuum. The yield is almost quantitative. The product is a hygroscopic solid.

EXAMPLE V

*Polymeric (p-phenylenediethylene) p-phenylenediacetamidine hydrochloride*

To a suspension of 2.932 parts of p-benzene diacetonitrile dimethyl diiminoether dihydrochloride (dimethyl p-phenylenediacetimidate dihydrochloride), in 10 parts of dry methanol, cooled to 0°, is added 1.643 parts of p-bis-(beta-aminoethyl) benzene in 5 parts of dry methanol cooled to 0°. The mixture is allowed to stand for 24 hours at 25°, the methanol then removed in vacuum and the product washed with dry ether and dried in vacuum. An almost quantitative yield of a white hygroscopic product is obtained.

EXAMPLE VI

*Polymeric hexamethyleneadipo-di-N-methylamidine hydrochloride*

To a suspension of 2.451 parts of adiponitrile dimethyl-diiminoether dihydrochloride in 5 parts of dry methanol is added, with cooling, a solution of 1.443 parts of N,N′-dimethylhexamethylenediamine in 4 parts of dry methanol. The mixture is then allowed to stand at 25° for 48 hours, the methanol removed by evaporation and the residue dried in vacuo. The product is a white, hygroscopic solid. The yield is almost quantitative.

EXAMPLE VII

*Polymeric dodecamethylenedodecanediamidine dihydrochloride*

To a suspension of 3.2929 parts of dimethyl dodecandioimidate dihydrochloride, (dodecamethylenedinitrile dimethyl diiminoether dihydrochloride),

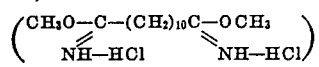

in 8 parts of methanol cooled to 0° is added 2.0035 parts of dodecamethylenediamine in 12 parts of methanol. The mixture is allowed to stand at room temperature for 24 hours. The methanol is removed in vacuo and the product washed with ether and then dried in vacuo. The yield is almost quantitative.

The above examples illustrate the preferred process of this invention for the preparation of representative polymeric amidine salts. New and useful polymeric amidine salts can be prepared similarly from any diiminoether salt which has at least four chain atoms between the carbon atoms carrying the nitrogen atoms of the imino ether group by reaction with any organic compound having two hydrogen bearing amino nitrogen atoms separated by a chain of at least four atoms, the valences of the nitrogen not attached to the chain or to hydrogen being satisfied by alkyl radicals of from one to five carbon atoms.

The diimino ether salts which may be employed may be formulated as:

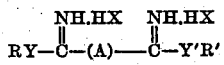

wherein X is the anion of a strong acid, i. e., having an ionization constant of at least $10^{-5}$, preferably a halogen of atomic weight between 35 and 126 and preferably chlorine. R and R' are aliphatic radicals, Y and Y' are oxygen or sulfur and the bivalent radical A separating the iminoether groups is any bivalent organic radical free from groups reactive with the diamines and free of groups reactive with the imino ether group. The bivalent organic radical A may be aliphatic, aromatic, cyclic or acyclic, homocyclic or heterocyclic, saturated or unsaturated, and may be unsubstituted or substituted with groups which do not react with diamines under the conditions of the polymerization reaction, e. g., the ether, sulfide, ketone, amide, etc. groups. Specific suitable diiminoether salts include the iminoether salts of the following dinitriles: adiponitrile, pimelonitrile, suberonitrile, azelonitrile, sebaconitrile, and decanodintrile, dodecanodinitrile, terephthalonitrile, 1,8-naphthonitrile, hexahydroterephthalonitrile, beta-phenyladiponitrile, betamethyladiponitrile, 4-ketopimelonitrile, 1,9-dicyano-5-nonanone, p-phenylene diacetonitrile, metaphenylene diacetonitrile, N-(beta-cyanoethyl) cyanoacetamide, 1,4-dicyanobutene-2. The imino ether salt may be prepared from such nitriles, hydrogen chloride or bromide and any alcohol. For convenience of preparation a lower alkanol, e. g., methanol, ethanol, isopropanol or butanol would be used as the imino ether salts from these alcohols are far more readily prepared in a pure state. A mixture of two or more iminoether salts may be employed. The preferred type of iminoether salts are those derived from aliphatic dinitriles and preferably from dinitriles of the formula $R(CN)_2$ wherein R is an aliphatic hydrocarbon radical, by reaction with a monohydric alcohol of from one to five carbon atoms in the presence of an acid, for example, hydrochloric, hydrobromic, and sulfuric acids.

The diamines which may be employed may be formulated as RHNBNHR' in which R and R' are H or alkyl groups of from one to five carbon atoms, preferably methyl or ethyl groups. The diamine may contain both a primary and a secondary amino group, as N-methylhexamethylenediamine. B may be any divalent organic radical having at least four atoms in a chain between the two hydrogen bearing nitrogen atoms and free from groups other than the two amino groups reactive with the iminoether group. B being in the diamine obviously contains no groups reactive with hydrogen containing amino group. B, subject to these limitations, may be aliphatic, aromatic, cyclic, or acyclic, homocyclic, or heterocyclic, saturated, or unsaturated, unsubstituted, or substituted with groups which do not react with the diamine or iminoether salt under the conditions of the polymerization reaction and is preferably hydrocarbon.

Specific suitable diamines include the following: tetramethylenediamine, pentamethylenediamine, hexamethylenediamine, heptamethylenediamine, octamethylenediamine, nonamethylenediamine, decamethylenediamine, undecamethylenediamine, dodecamethylenediamine, tetradecamethylenediamine, 1,4,-cyclohexanediamine, p-xylylenediamine, p-bis-(beta-aminoethyl) benzene, 1,4-diaminonaphthalene, p,p'-diaminodiphenyl ether, p,p'-diaminodiphenylmethane, p,p'-diaminodiphenylsulfide, p,p'-diaminodiphenylsulfoxide, p,p'-diaminodiphenylsulfone, 1,4-diaminoanthraquinone, N-methylhexamethylenediamine, N-methyldecamethylenediamine, N,N'-dimethylhexamethylenediamine, N,N'-dimethyldecamethylenediamine, 4,4'-diaminotriphenylmethane, mono-β-alanylethylenediamine, monoglycylethylenediamine, and 2,5-diaminomethylbutadienecyclicsulfone.

The preferred diamines are the aliphatic primary diamines. More than one diamine and/or more than one iminoether salt may be used in the reaction to give a polymeric product.

While from the method of preparation the amidine hydrochlorides and hydrobromides are preferred the salts of other acids may be made by releasing the free amidine from the salt by means of caustic in water, sodium ethylate in absolute alcohol, etc., and then neutralizing the free amidine with the desired acid. In the case of weak acids, non-aqueous solutions are preferred for the salt formation. There may be thus prepared the borate, carbonate, sulfate, nitrate, acetate, lactate, tartrate, benzoate, and stearate.

By far the most preferred phase of the invention is that of linear polymeric primary amidines as above described. The invention, however, also includes within its scope the polymeric primary amidines having a plurality of

groups in a chain and prepared as above described from iminoether salts of polynitriles, including trinitriles, etc., and polyamines having a plurality of hydrogen bearing amino nitrogen atoms including triamines, e. g., bis(ω-aminohexyl) amine $H_2N(CH_2)_6NH(CH_2)_6NH_2$.

The diluents for the reaction serve to effect a homogeneous solution of the ingredients and end-products. The requirements for a diluent are that the starting material be at least slightly soluble in it and that the diluent chosen not react with either of the starting materials. The preferred solvent is a monohydric alcohol of from one to five carbon atoms, e. g., methanol and ethanol.

While the reactants were employed in the foregoing examples in chemically equivalent amounts, it is permissible to depart somewhat from this ratio of reactants without going beyond the scope of the invention. The use of an excess, even up to 20%, over that chemically equivalent, of either ingredient, serves either to lower the average length of the chain or the excess employed may be found in the reaction mixture and is ordinarily therefore undesirable.

The temperature at which the reaction is conducted is maintained sufficiently low to avoid decomposition of the iminoether salt. Thus it is necessary to operate below 120° and preferably below 50° and ordinarily at 20–30°. The reaction is slower at lower temperatures but will proceed to at least a slight extent so long as the reaction mixture is liquid. The reaction may be carried out at subatmospheric, atmospheric, or superatmospheric pressure.

The products of the present invention are linear polymeric materials having a plurality of primary amidine salt groups as integral chain members. They may also be described as linear polymeric products having primary amidine salt groups of the formula

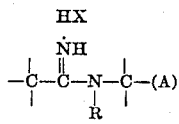

as recurring units in the linear polymeric chain. In this R is hydrogen or an alkyl group of from one to five carbon atoms and A is a bivalent organic radical and X is an organic or inorganic anion.

The expressions "primary amidine" and "primary amidine salts," whenever they occur in the specification and claims, signify that the imino group, i. e., the =NH or =NH,HX group attached to a carbon atom through a double bond. is primary, in other words, substitution on the nitrogen atom of the imino group is excluded. The term "primary" does not refer to the amido type nitrogen present in the amidine group, and inspection of the above formula shows that the amido nitrogen atom is either secondary or tertiary.

The compounds may also be formulated as compounds of the formula

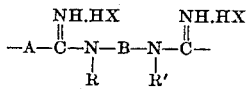

wherein A and B are divalent organic radicals having their free valences stemming from carbon and free from groups reactive with iminoether groups and hydrogen bearing amino groups. R and R' are hydrogen or alkyl radicals of from one to five carbon atoms and X is the anion of an acid or a tautomeric form of the same in the case of the primary amidine salts from primary diamines. These tautomeric formulas are

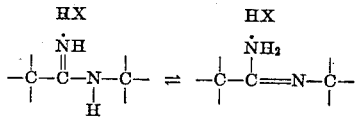

On treatment with alkali, the polymeric amidine salt is converted to the free amidine base which may be isolated. If the alkaline solution is heated to refluxing, a polyamide and ammonia are first formed followed by decomposition of the polyamide to a dicarboxylic acid and a diamine.

These products may also be prepared from compounds which contain a primary or secondary amino group and an iminoether salt group in the same molecule. As examples of such materials may be mentioned omega-aminocapronitrile methyl iminoether hydrochloride and omega-amidodecanonitrile methyl iminoether hydrochloride. The reaction may be accomplished by treating the dihydrochloride with one equivalent of alkali.

With compounds of this type at least five atoms must intervene in the chain between the amino groups and the carbon atom carrying the nitrogen of the iminoether salt group.

In the compounds derived from diamines and diiminoethers, the intralinear amidine nitrogen atom is alternately to the right and to the left of the carbon bearing the extralinear amidine nitrogen atom. In the compounds derived from the omega amino iminoethers, the intralinear amidine nitrogen atom recurs on the same side of the carbon bearing the extralinear amidine nitrogen atom.

The products of this invention are useful as pesticidal agents especially as bactericides and fungicides. They are also useful as emulsifying agents, and as dyeing assistants.

The above description and examples are intended to be illustrative only. Any modification of or variation therefrom which conforms to the spirit of the invention is intended to be included within the scope of the claims.

What is claimed is:

1. A polymer characterized by the presence, as integral chain members, of primary amidine salt groups wherein the extralinear valences of the intralinear nitrogen atoms, not satisfied by hydrogen, are satisfied by alkyl radicals of from one to five carbon atoms, and the amidine salt groups are separated by bivalent organic radicals free from groups reactive with the hydrogen bearing amino group and the imino ether group, and having a carbon containing chain of at least four atoms between the free valences which valences stem from carbon.

2. A linear polymer characterized by the presence, as integral chain members, of primary amidine salt groups wherein the extralinear valences of the intralinear nitrogen atoms, not satisfied by hydrogen, are satisfied by alkyl radicals of from one to five carbon atoms, and the amidine salt groups are separated by bivalent organic radicals free from groups reactive with the hydrogen bearing amino group and the imino ether group, and having a carbon containing chain of at least four atoms between the free valences which valences stem from carbon.

3. A linear polymer having in the chain recurring units of the formula

wherein HX is an acid and R is a member of the class consisting of hydrogen and alkyl groups of from one to five carbon atoms, said recurring units being separated by bivalent organic radicals free from groups reactive with the hydrogen bearing amino group and the imino ether group, and having a carbon containing chain of at least four atoms between the free valences which valences stem from carbon.

4. A linear polymer of the structural formula

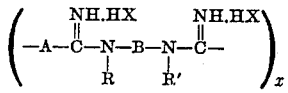

wherein $x$ represents the number of structural units in the polymer, A and B are bivalent organic radicals having at least four chain atoms between the free valences, which valences stem from carbon, and free from groups reactive with hydrogen bearing amino groups and imino ether groups, R and R' are selected from the class consisting of hydrogen and alkyl groups of from one to five carbon atoms and HX is an acid, said linear polymer yielding ammonia, a diamine RNHBNHR' and the alkali metal salt of a dicarboxylic acid A(CO₂H)₂ on refluxing with aqueous alkali solutions.

5. A linear polymer according to claim 4 wherein A and B are aliphatic radicals.

6. A linear polymer according to claim 4 wherein A and B are aliphatic hydrocarbon radicals.

7. A linear polymer according to claim 4 wherein A and B are polymethylene radicals.

8. Polymeric hexamethyleneadipamidine hydrochloride.

9. A linear polymer according to claim 4 wherein B is a bivalent aromatic hydrocarbon radical.

10. Process which comprises reacting an adiponitrile dimethyl diiminoether salt of an acid having an ionization constant of at least $1 \times 10^{-5}$ with hexamethylenediamine to yield a polymeric hexamethyleneadipamidine salt.

11. A linear polymer having in the chain recurring units of the formula

wherein HX is an acid and R is a hydrogen atom, said units being separated by bivalent organic radicals free from groups reactive with the hydrogen bearing amino group and the imino ether group, and having a carbon containing chain of at least four atoms between the free valences, which valences stem from carbon.

12. A linear polymer having recurring units of the formula

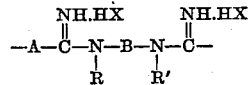

wherein A and B are bivalent organic radicals having at least four chain atoms between the free valences and free from groups reactive with hydrogen bearing amino groups and imino ether groups, R and R' are hydrogen atoms, and HX is an acid.

13. The linear polymeric amidine salt reaction product of decamethylenediamine and sebaconitrile dimethyldiimino ether dihydrochloride.

14. A linear polymer having in the chain recurring primary amidine salt groups separated by saturated aliphatic hydrocarbon chains of at least four chain atoms in which polymer the extralinear valences of the intralinear nitrogens, not satisfied by hydrogen, are satisfied by alkyl groups of from one to five carbon atoms.

15. A linear polymer having in the chain recurring primary amidine salt groups separated by hydrocarbon chains of at least four chain atoms in which polymer the extralinear valences of the intralinear nitrogens, not satisfied by hydrogen, are satisfied by alkyl groups of from one to five carbon atoms.

16. A linear polymer having in the chain recurring primary amidine salt groups separated by polymethylene radicals of at least four chain atoms in which polymer the extralinear valences of the intralinear nitrogens, not satisfied by hydrogen, are satisfied by alkyl groups of from one to five carbon atoms.

17. Process which comprises reacting, in a liquid medium at a temperature below 50° C., a salt, with an acid of ionization constant of at least $1 \times 10^{-5}$, of a polyiminoether otherwise free from groups reactive with the hydrogen bearing amino group and the iminoether group, and in which the ether groups are aliphatic and the iminoether groups are separated by a chain of at least four atoms, with a polyamine which is otherwise free from groups reactive with the hydrogen bearing amino group and the iminoether group and has a chain of at least four atoms between two hydrogen bearing amino nitrogen atoms, and in which the valences of the nitrogen atoms not attached to hydrogen and chain atoms are attached to alkyl radicals of from one to five carbon atoms.

18. Process which comprises reacting, in a liquid menstruum at a temperature below 50° C., a salt, with an acid of ionization constant of at least $1 \times 10^{-5}$, of a diiminoether otherwise free from groups reactive with the hydrogen bearing amino group and the iminoether group and in which the ether groups are aliphatic and the iminoether groups are separated by a chain of at least four atoms, with a diamine which is otherwise free from groups reactive with the hydrogen bearing amino group and the iminoether group and has a chain of at least four atoms between two hydrogen bearing amino nitrogen atoms and in which the valences of the nitrogen atoms not attached to hydrogen and chain atoms are attached to alkyl radicals of from one to five carbon atoms.

19. Process which comprises reacting, in a liquid menstruum at a temperature below 50° C., a salt, with an acid of ionization constant of at least $1 \times 10^{-5}$, of an aliphatic diiminoether which is otherwise free from groups reactive with the hydrogen bearing amino group and the iminoether group and contains at least four chain members between the carbon atoms carrying the imino groups, and in which the ether groups are aliphatic, with an aliphatic diamine which is otherwise free from groups reactive with the hydrogen bearing amino group and the iminoether group and contains at least four chain members between the two hydrogen bearing nitrogens and in which the valences of the nitrogen atoms not attached to hydrogen and chain atoms are attached to alkyl radicals of from one to five carbon atoms.

20. Process which comprises reacting a salt, with an acid of ionization constant of at least $1 \times 10^{-5}$, of an aromatic diiminoether which is otherwise free from groups reactive with the hydrogen bearing amino group and the iminoether group and contains at least four chain members between the carbon atoms carrying the imino groups and in which the ether groups are aliphatic, with a diamine which is otherwise free from groups reactive with the hydrogen bearing amino group and the iminoether group and contains at least four chain atoms between the hydrogen bearing nitrogens, of which the valences, not satisfied by hydrogen and chain atoms, are attached to alkyl radicals of from one to five carbon atoms.

21. Process which comprises reacting the hydrochloride of a diiminoether which is otherwise free from groups reactive with the hydrogen bearing amino group and the iminoether group and contains at least four chain atoms between the two carbon atoms carrying the imino nitrogen atoms and in which the ether groups are aliphatic, with a diamine which is otherwise free from groups reactive with the hydrogen bearing amino group and the iminoether group and contains a chain of at least four carbon atoms between the hydrogen bearing nitrogens, the valences of which, not satisfied by hydrogen and chain atoms, are attached to alkyl radicals of from one to five carbon atoms to yield a polymeric amidine salt.

22. Linear polymeric p-xylyleneadipamidine hydrochloride.

MADISON HUNT.
JAMES EMORY KIRBY.